United States Patent [19]

Eberling et al.

[11] Patent Number: 4,465,415

[45] Date of Patent: Aug. 14, 1984

[54] MAGNETIC SPREADING DEVICE FOR A SHEET METAL STACK OF INDIVIDUAL MAGNETIZABLE LAMINATIONS WITH A CENTRAL HOLE

[75] Inventors: Richard Eberling, Feucht; Werner Voll, Nuremberg, both of Fed. Rep. of Germany

[73] Assignee: Siemens Aktiengesellschaft, Berlin and Munich, Fed. Rep. of Germany

[21] Appl. No.: 379,555

[22] Filed: May 18, 1982

[30] Foreign Application Priority Data

May 27, 1981 [DE] Fed. Rep. of Germany ....... 3121203

[51] Int. Cl.³ .............................................. B65G 59/04
[52] U.S. Cl. .................................... 414/122; 271/1;
271/18.1; 294/2; 294/65.5; 414/27; 414/114;
414/606
[58] Field of Search ................. 414/27, 114, 122, 606,
414/744 C, 908; 271/1, 18.1, 18.2; 294/2, 65.5;
335/286, 291, 292, 293

[56] References Cited

U.S. PATENT DOCUMENTS

| 2,875,909 | 3/1959 | Babick et al. | 414/27 |
| 3,230,425 | 1/1966 | Trimble | 335/291 |
| 3,353,822 | 11/1967 | Dangelmaier et al. | 271/18.1 |
| 3,687,303 | 8/1972 | Kramer et al. | 414/114 |
| 4,079,512 | 3/1978 | Lakes | 414/114 X |

FOREIGN PATENT DOCUMENTS 779247 11/1980 U.S.S.R. .................................. 294/2

Primary Examiner—Leslie J. Paperner
Attorney, Agent, or Firm—Kenyon & Kenyon

[57] ABSTRACT

For lifting the topmost, spread apart, magnetizable individual lamination with a central hole off a lamination stack stored without a mandrel and/or for transporting at least substacks of the lamination stack to a different location, a centering mandrel is provided suspended from a movable lifting device and contains, in a non-magnetic tubular body closed on both sides, at least one separately switchable spreading electromagnet, the centering mandrel carrying at the upper end, at least one switchable adhesion device arranged outside the tubular body, for grabbing the electromagnetically spread apart topmost individual lamination. The centering mandrel is lowered into the central hole of the lamination stack, and then at least one spreading electromagnet is switched on.

For obtaining the topmost individual lamination, the adhesion device is switched off after the spreading electromagnet is switched off, and the individual lamination is taken from the centering mandrel. For transporting at least one partial stack, the adhesion device can remain switched off and the centering mandrel can be moved about using only the energized spreading electromagnets.

4 Claims, 1 Drawing Figure

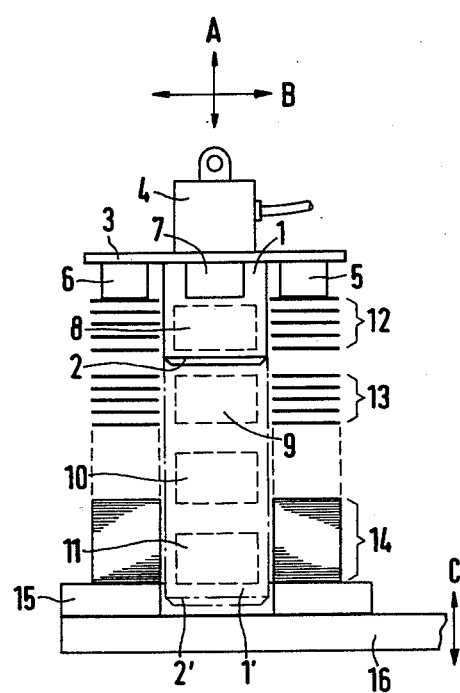

MAGNETIC SPREADING DEVICE FOR A SHEET METAL STACK OF INDIVIDUAL MAGNETIZABLE LAMINATIONS WITH A CENTRAL HOLE

BACKGROUND OF THE INVENTION

This invention relates to magnetic devices for spreading sheet metal stacks of laminations in general and more particularly to an improved device of this nature.

Magnetic devices for spreading a stack of magnetizable individual sheet metal laminations with a central hole, in which the individual laminations in the stack are guided by a prismatic mandrel which fits in the central hole, are known. In the known magnetic spreading devices for such lamination stacks, which are deposited on pallets with upright centering mandrels, vertically supported permanent spreading magnets, which spread the individual laminations apart in fan-like fashion over their axial range of action, are used. In order to spread apart the upper end regions of the lamination stacks guided by the centering mandrels, the magnets are disposed about the outer periphery of the end regions. This is done to permit removal, individually, of the respective uppermost individual laminations, so that the respectively uppermost individual lamination can be taken off and be moved to further processing stations located elsewhere. This is necessary, for instance, in the case of stored circular blanks for electric machines or apparatus for feeding the individual laminations to stamping presses.

In this kind of spreading device, a vertical centering mandrel is required for every lamination stack to guide the spread apart individual laminations. The mandrel determines the maximum height of the lamination stack and must have an outside diameter adapted to the size of the central hole of the individual laminations. In addition, the upright magnetic spreading device must be adapted to the outside diameter of the lamination stack, so that it surrounds the lamination stack with a definite uniform spacing. Since this spreading device surrounds the lamination stack in the upper region, access to the respective spread-apart uppermost individual laminations is made more difficult and, because of the mentioned arrangement, more space is required in the surroundings of each lamination stack for mounting the spreading device.

It is an object of the present invention to provide a magnetic spreading device in which the centering mandrels for the individual lamination stacks are unnecessary, the space required around each lamination stack can be kept smaller, and the height of the lamination stacks can be chosen freely according to the respective requirements. Optionally, the spreading device can also be used at the same time as transporting means at least for parts of the stacks.

SUMMARY OF THE INVENTION

This object is accomplished by using a centering mandrel which is suspended so that it can be raised and lowered and which comprises a nonmagnetic tubular body closed off on one side and containing at least one switchable electromagnet on its inside. In addition, the mandrel includes at least one separately switchable adhesion device outside the tubular body at its upper end, for lifting the topmost individual lamination which has been spread apart.

In the illustrated embodiment, a plurality of switchable magnets are provided in the nonmagnetic tube. The adhesion devices are fastened to the underside of a nonmagnetic upper terminating plate protruding beyond the periphery of the mandrel. Each adhesion device may be a vacuum device, or an electromagnetic device, for example.

In the disclosed embodiment, the centering mandrel is held by a lifting device or slider that can be moved. A contactless electric feeler is arranged on the underside of the terminating plate ahead of the adhesion device.

BRIEF DESCRIPTION OF THE DRAWING

The single FIGURE is a schematic elevation view of a spreading device according to the present invention.

DETAILED DESCRIPTION

On a pallet 15 which can be adjusted in height in the direction of the arrow C by means of a lifting device 16, a lamination stack of individual, magnetizable laminations with a central hole is freely stored. The central holes of the individual laminations are lined up sufficiently accurately to permit lowering a centering mandrel 1 or 1', which is suspended and can be raised and lowered in the direction of the arrow A, into the lamination stack from above.

If it is primarily important to remove the uppermost individual lamination from a stack of laminations, a short centering mandrel 1 with only one spreading electromagnet 8 in the interior of its nonmagnetic tubular body can be used. The tubular body is closed at the bottom by a nonmagnetic bottom plate 2 and contains only the spreading electromagnet 8 which has been cast into the tubular body. On its top side, the tubular body is closed off by a nonmagnetic terminating plate 3 which protrudes beyond the circumference of the mandrel and is connected to a lifting device or slider unit, not shown at the top. The lifting device 4 contains the terminal connections for the spreading electromagnet 8.

On the underside of the terminating plate 3, two diametrically opposed adhesion devices 5 and 6 for grabbing the spread-apart uppermost individual lamination are provided as well as a contactless electric feeler 7 which, in the axial mandrel direction, ends in front of the undersides of the adhesion devices, i.e., when being held the lamination does not touch feeler 7. The adhesion devices 5 and 6 can be operated independently of the spreading electromagnet 8. In cases where unperforated individual laminations are to be taken up, vacuum equipment with switchable exhaust may be provided as the adhesion devices. Otherwise, switchable electromagnets can be used for this purpose. As soon as the uppermost individual lamination is held by the adhesion devices 5 and 6, the individual lamination can be removed. This can be done manually or by a transporting device, after the spreading electromagnet 8 is switched off and the stack portion 12 has dropped onto the rest of stack 14 under the centering mandrel 1. Removal is accomplished after the adhesion devices are switched off. By reconnecting the spreading electromagnet 8 and the adhesion devices 5 and 6, the upper region of the lamination stack is spread apart again and the individual lamination which is now at the top is then lifted off.

In order that the distance of the remaining stack from the spreading electromagnet and the adhesion devices does not become too large to put the necessary functioning in doubt, a control signal for the lifting device 16 can be given by the contactless feeler 7. The lifting device then lifts the rest of the stack via the pallet to the initial distance again. It is assumed here that the bottom plate 2 has sufficient distance from the upper edge of the remaining stack, after the spread-apart section has dropped off, so that the uppermost individual lamination between the two can be removed.

On the other hand, the centering mandrel with the mandrel lamination held there must be lifted in the direction of the arrow A by a control signal, and/or the pallet 16 must be lowered in the direction of the arrow O.

If the removal of the uppermost individual lamination is not desired, but rather the distribution of the lamination stack into sub-stacks at different locations from which the individual laminations are to be taken off for further processing, a spreading device with the spreading electromagnet 8 switched on, which is positioned in the directions A and B of the arrows by a movable lifting device, not shown, can likewise be used.

For transporting the entire lamination stack or at least a major part thereof, the centering mandrel 1' can be extended, as indicated by dash-dotted lines, for containing several mutually spaced and separately switched spreading electromagnets 8 to 11. In this case the tube is closed off by a bottom plate 2'. Preferably, the electromagnets are cast into the tube, insulated therefrom.

In the case shown, the spreading electromagnet 8 as well as the spreading electromagnet 9 is switched on with the centering mandrel 1' fully lowered into the lamination stack, so that the associated partial stacks 12 and 13 are lifted off the rest of the stack 14 and are spread apart. If the remaining spreading electromagnets 10 and 11 are also energized, the rest of the stack 14 will be divided into two further partial stacks and the stacks will be spread apart, so that a total of four spread-apart partial stacks can be transported by the centering mandrel 1', and the individual substacks can be deposited at one or more locations by switching off the individual spreading electromagnets.

What is claimed is:

1. In a magnetic spreading device with liftable and lowerable spreading magnets for removal of magnetizable individual laminations of a sheet metal stack with a central hole, the individual laminations, spread apart by magnetic force, are guided by a non-magnetic centering mandrel which fits into the central hole, and an adhesion device arranged on a carrying device for picking up the spread upper lamination, the improvement comprising:
   (a) the magnetic separation device, the adhesion device and the centering mandrel being consolidated into a single component which can be raised, lowered and pivoted, and including;
      (i) a non-magnetic tubular body which is closed off on one side for fitting into said hole;
      (ii) at least one switchable spreading electromagnet in the interior thereof; and
      (iii) at least one separately switchable adhesion device for the topmost individual lamination lifted by said spreading electromagnet disposed at the upper end of said tubular body.

2. The improvement according to claim 1, comprising a plurality of spreading electromagnets arranged in the centering mandrel, one on top of the other with spacing, adapted to be switched separately, said magnets cast into and insulated from said tubular body.

3. The improvement according to claim 1 comprising a nonmagnetic upper terminating plate which protrudes beyond the mandrel periphery, said adhesion devices fastened to the underside of said plate.

4. The improvement according to claim 3 and further including a contactless electric feeler on the underside of said terminating plate, said feeler ending ahead of said adhesion device in the axial direction of the mandrel.

* * * * *